US011103942B2

(12) United States Patent
Prusakov et al.

(10) Patent No.: US 11,103,942 B2
(45) Date of Patent: *Aug. 31, 2021

(54) DUSTLESS ONE-STROKE CUT-THROUGH SAW

(71) Applicant: CLEAN CUTTERS LLC, Minnetonka, MN (US)

(72) Inventors: Dmitry Prusakov, Eden Prairie, MN (US); Igor Klimchuk, Eden Prairie, MN (US)

(73) Assignee: Clean Cutters LLC, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,898

(22) Filed: Apr. 6, 2020

(65) Prior Publication Data

US 2020/0230719 A1 Jul. 23, 2020

Related U.S. Application Data

(63) Continuation of application No. 16/148,793, filed on Oct. 1, 2018, now Pat. No. 10,610,939.

(Continued)

(51) Int. Cl.
*B23D 49/10* (2006.01)
*B23D 51/01* (2006.01)
(Continued)

(52) U.S. Cl.
CPC ......... *B23D 49/105* (2013.01); *B23D 49/001* (2013.01); *B23D 51/01* (2013.01); *B27G 5/02* (2013.01); *B23D 51/04* (2013.01)

(58) Field of Classification Search
CPC .... B23D 49/105; B23D 49/001; B23D 51/01; B23D 45/107; B23D 49/10; B23D 49/00; B27B 5/188
(Continued)

(56) References Cited

U.S. PATENT DOCUMENTS

| 1,259,380 A | * | 3/1918 | Eagleson | B27G 5/02 83/766 |
| 1,653,386 A | * | 12/1927 | Beyland | B27G 5/02 83/766 |

(Continued)

FOREIGN PATENT DOCUMENTS

| FR | 2790218 A1 | * | 9/2000 | B23D 51/04 |
| GB | 2354733 A | * | 4/2001 | B23D 51/14 |

*Primary Examiner* — Ghassem Alie
*Assistant Examiner* — Nhat Chieu Q Do
(74) *Attorney, Agent, or Firm* — Dmitry Zuev, Esq.

(57) ABSTRACT

A saw system capable of cutting through a workpiece in one stroke is provided. The saw system includes a base, a turntable mounted on the base for rotation about a vertical axis, a support structure defining a cutting axis and fixedly attached to the turntable, and an elongated blade including a cutting edge. The turntable has a substantially planar support surface for supporting a workpiece. The support structure includes a pair of parallel sliding members, wherein the sliding members are disposed in a direction substantially parallel to the cutting axis. The elongated blade is spaced apart from the sliding members and is movable along the sliding members. The cutting edge includes a proximal end and a distal end, wherein an angle between an imaginary line connecting the distal end of the cutting edge to the proximal end thereof and its projection onto the turntable is an acute angle.

11 Claims, 9 Drawing Sheets

Related U.S. Application Data

(60) Provisional application No. 62/619,769, filed on Jan. 20, 2018.

(51) Int. Cl.
*B23D 49/00* (2006.01)
*B27G 5/02* (2006.01)
*B23D 51/04* (2006.01)

(58) Field of Classification Search
USPC .................. 83/471, 471.3, 767, 614, 455
See application file for complete search history.

(56) References Cited

U.S. PATENT DOCUMENTS

| | | | | |
|---|---|---|---|---|
| 4,428,266 A * | 1/1984 | Keddie | .................. | B23D 51/01 30/517 |
| 4,452,117 A * | 6/1984 | Brickner | .............. | B23D 59/005 83/468 |
| 4,455,908 A * | 6/1984 | Keddie | ................ | B23D 51/025 83/767 |
| 5,392,679 A * | 2/1995 | Wang | .................... | B23D 51/025 83/698.11 |
| D356,802 S * | 3/1995 | Keife | ........................... | D15/133 |
| 5,482,026 A * | 1/1996 | Russell | .................. | B23D 47/02 125/12 |
| 5,575,191 A * | 11/1996 | Wang | ...................... | B27G 5/02 83/699.51 |
| 5,713,258 A * | 2/1998 | Keddie | .................. | B23D 51/02 83/581 |
| 5,957,023 A * | 9/1999 | Cheng | .................... | B23D 51/02 83/581 |
| 6,131,499 A * | 10/2000 | Chen | ........................ | B27G 5/02 83/762 |
| 6,698,328 B1 * | 3/2004 | Schmidt | .................... | B27G 5/02 83/468.3 |
| 6,928,911 B1 * | 8/2005 | Ratkus | ................. | B26D 1/0006 83/171 |
| 7,946,906 B2 * | 5/2011 | Gifford | .................... | B27B 27/08 451/8 |
| 10,144,144 B2 * | 12/2018 | Firth | ........................ | G02B 6/46 |
| 10,610,939 B1 * | 4/2020 | Prusakov | ............. | B23D 49/001 |
| 2003/0033923 A1 * | 2/2003 | Chen | ........................ | B27G 5/02 83/767 |
| 2005/0016631 A1 * | 1/2005 | Zhang | .................... | B23Q 11/10 144/286.5 |
| 2008/0047411 A1 * | 2/2008 | Cao | ........................ | B23D 47/02 83/829 |
| 2008/0276773 A1 * | 11/2008 | Togare | ................... | B23D 47/02 83/34 |
| 2010/0050446 A1 * | 3/2010 | Heflin | ..................... | B27B 27/08 30/388 |
| 2011/0179929 A1 * | 7/2011 | Angel | ...................... | B26D 1/04 83/614 |
| 2013/0126573 A1 * | 5/2013 | Hosseini | ............ | B23K 26/0622 225/2 |
| 2013/0126574 A1 * | 5/2013 | Mallet | ................... | B28D 1/228 225/2 |

* cited by examiner

DUSTLESS ONE-STROKE CUT-THROUGH SAW

CROSS-REFERENCE TO RELATED APPLICATION

This application is a continuation of U.S. application Ser. No. 16/148,793 filed Oct. 1, 2018, which claims priority to U.S. Provisional Application No. 62/619,769 filed Jan. 20, 2018 with the United States Patent and Trademark Office, and all the benefits accruing therefrom under 35 U.S.C. §§ 119 and 120, the contents of which applications are incorporated herein in their entireties by reference.

TECHNICAL FIELD

The present disclosure relates to a new non-circular saw system, and specifically, to a saw system which allows to cut through a workpiece in one stroke.

BACKGROUND

Reciprocal and circular saws are widely used in commercial settings and at homes for cutting various materials, such as wood, medium density fiberboard (MDF), high density fiberboard (HDF), and composite board. These saws usually produce a large amount of sawdust. Cutting wood or plastic at a typical work site results in debris that is scattered over a wide area and sawdust that is released in the air. The fine dust pollutes the environment, and its inhalation may harm the health of a saw operator. Wearing personal protection equipment during sawing activities is therefore necessary to avoid respiratory damage.

While the saw operator may use protective clothing and a dust mask for personal protection, this does not resolve the problem of dust scattering around the work area. The environmental problem is of particular concern when sawing is conducted indoors, where the dust will fall on carpets, furniture, and other room furnishings. Drop cloths may be available to protect the immediate area around the saw cutting operation, however, finer dust particles may still settle a significant distance away from the work site.

Various sophisticated saw systems are available on the market that are equipped with a built-in dust extractor or vacuum dust collector. However, because of design complexity, most of these saws are expensive, electricity driven, and difficult to operate. There remains a need for an affordable yet effective, portable, and easily manageable saw system that will produce a minimum amount of dust during the sawing operation.

SUMMARY

A saw system capable of cutting through a workpiece in one stroke is provided. The saw system includes a base, a turntable mounted on the base for rotation about a vertical axis, a support structure defining a cutting axis and fixedly attached to the turntable, and an elongated blade including a cutting edge. The turntable has a substantially planar support surface for supporting a workpiece. The support structure includes a pair of parallel sliding members, wherein the sliding members are disposed in a direction substantially parallel to the cutting axis. The elongated blade is spaced apart from the sliding members and is movable along the sliding members. The cutting edge includes a proximal end and a distal end, wherein an angle between an imaginary line connecting the distal end of the cutting edge to the proximal end thereof and its projection onto the turntable is an acute angle.

The cutting edge may include a portion having a straight contour, a portion having a curved contour, or a combination thereof. The curved contour may have a convex shape.

The angle between the imaginary line connecting the distal end of the cutting edge to the proximal end thereof and its projection onto the turntable may be from about 3° to about 10°, for example, from about 5° to about 8°.

The sliding members may be rods disposed horizontally one over the other.

The turntable may further include a slot coextensive with the cutting axis, wherein the slot may be parallel to the sliding members.

A lower portion of the elongated blade comprising the proximal end of the cutting edge may be positioned inside the slot. A higher portion of the elongated blade including the proximal end of the cutting edge may be positioned outside the slot.

The carrying assembly may be a panel fixedly attached to the elongated blade.

The saw system may further include a handle assembly disposed on or formed as a part of the carrying assembly.

The support structure may further include a bearing member fixedly attached to the carrying assembly. The bearing member may be mechanically engaged with the sliding members. The bearing member may be capable of translationally moving along the sliding members.

The sliding members may include coinciding proximal ends and coinciding distal ends. A movement of the sliding member may be restricted between the proximal ends of the of the sliding members and the distal ends thereof.

The bearing member may be coupled to the sliding members in a manner which permits the movement of the sliding member between a disengaged position, wherein a location of the sliding member coincides with the proximal ends of the sliding members, and an engaged position, wherein a location of the sliding member coincides with the distal ends of the sliding members. Upon the movement of the bearing member between the disengaged position and the engaged position, the elongated blade may cut through the workpiece in one push stroke.

The workpiece may be a stationary workpiece, and the elongated blade may be movable along the sliding members to cut through the stationary workpiece in one push stroke.

The elongated blade may be a SharpTooth™ 15" hand saw blade.

The workpiece may include wood or plastic. The workpiece is a dowel, a pipe, a floor trim, a door trim, a window trim, a ceiling trim, a wall trim, or a multi-purpose trim.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1:
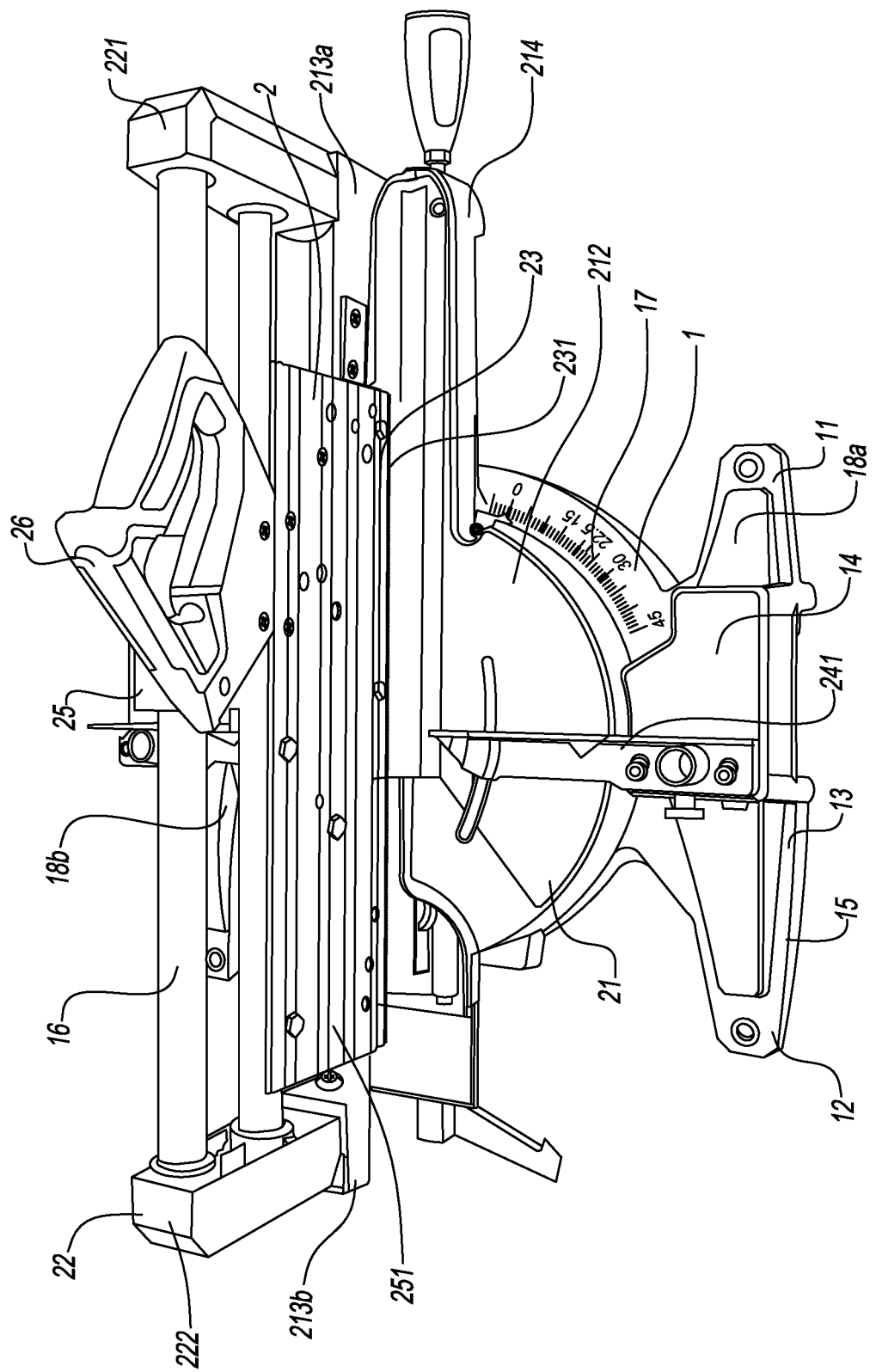
FIG. 1 is a side view of the saw system, according to an embodiment.
Figure 2:
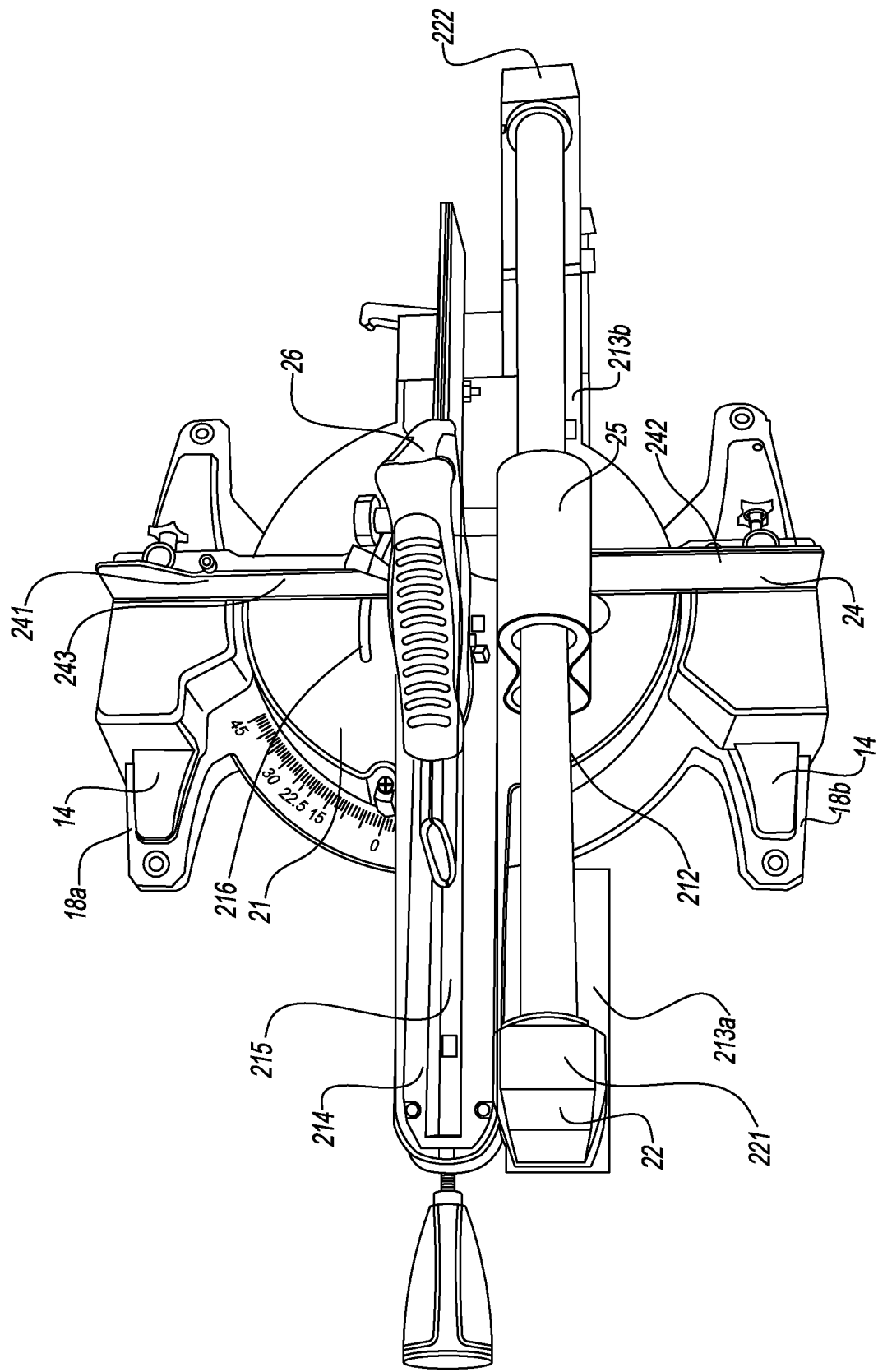
FIG. 2 is a top view of the saw system, according to an embodiment.
Figure 3:
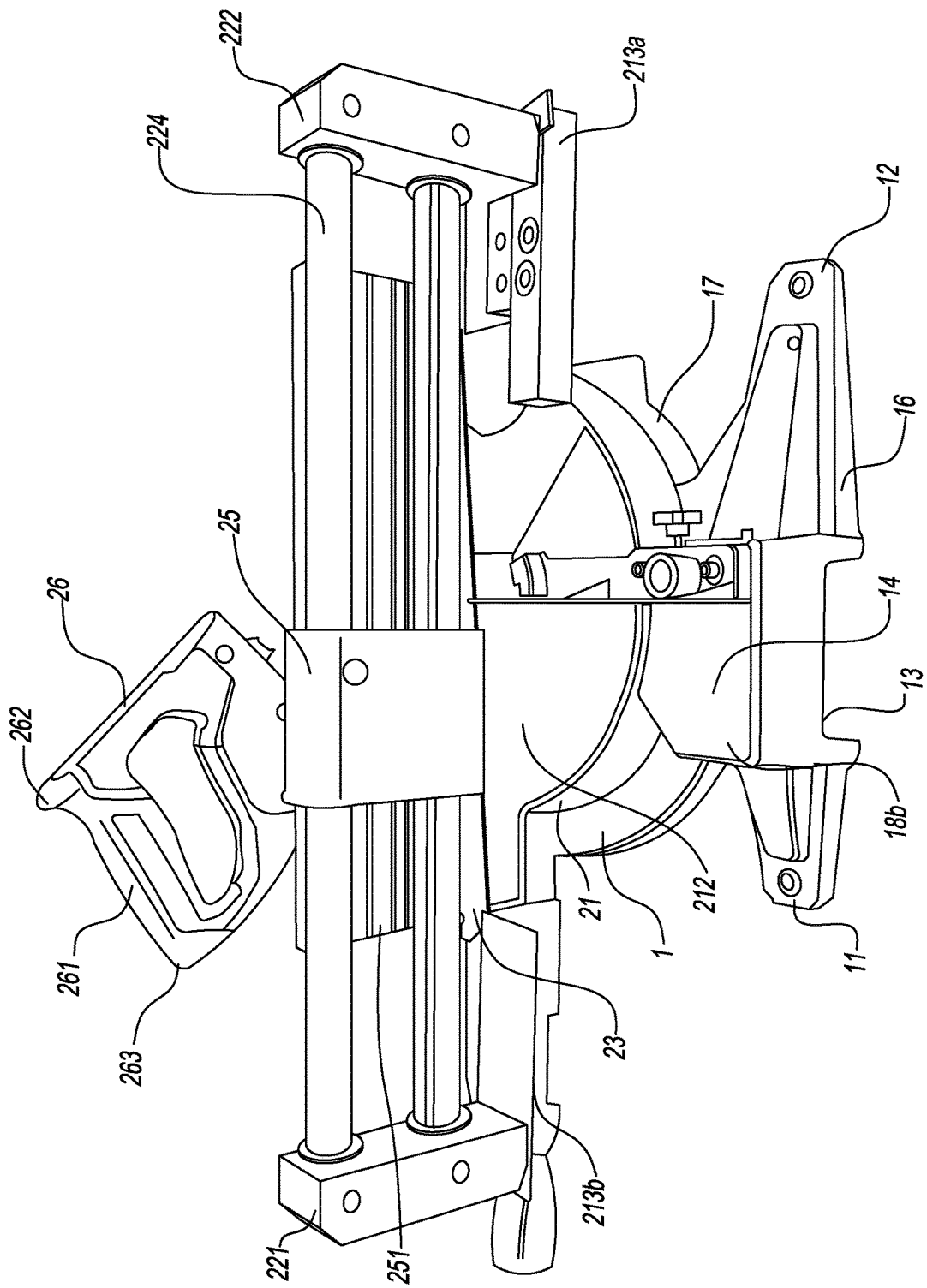
FIG. 3 is another side view of the saw system, according to an embodiment.
Figure 4:
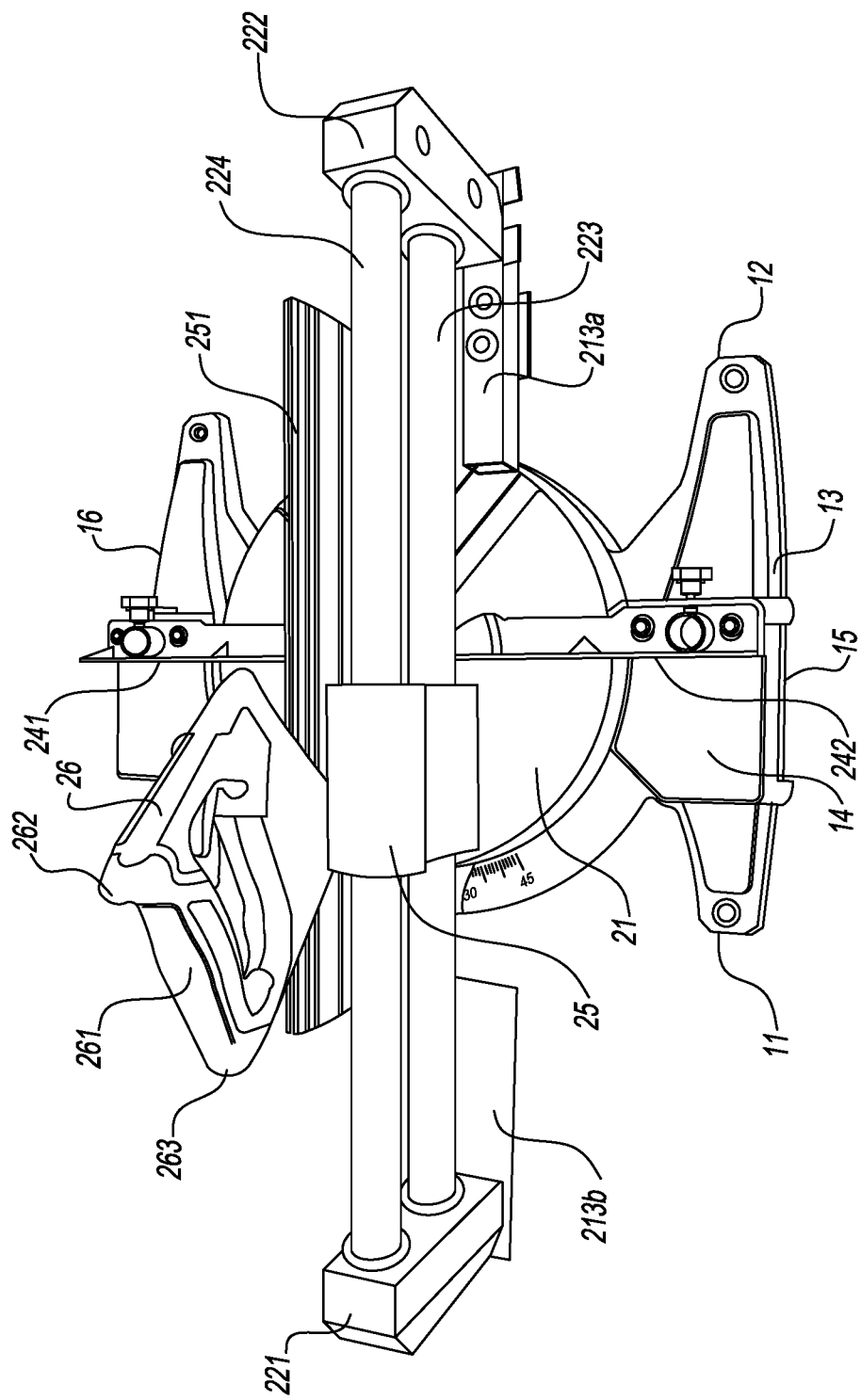
FIG. 4 is an elevated side view of the saw system, according to an embodiment.
Figure 5:
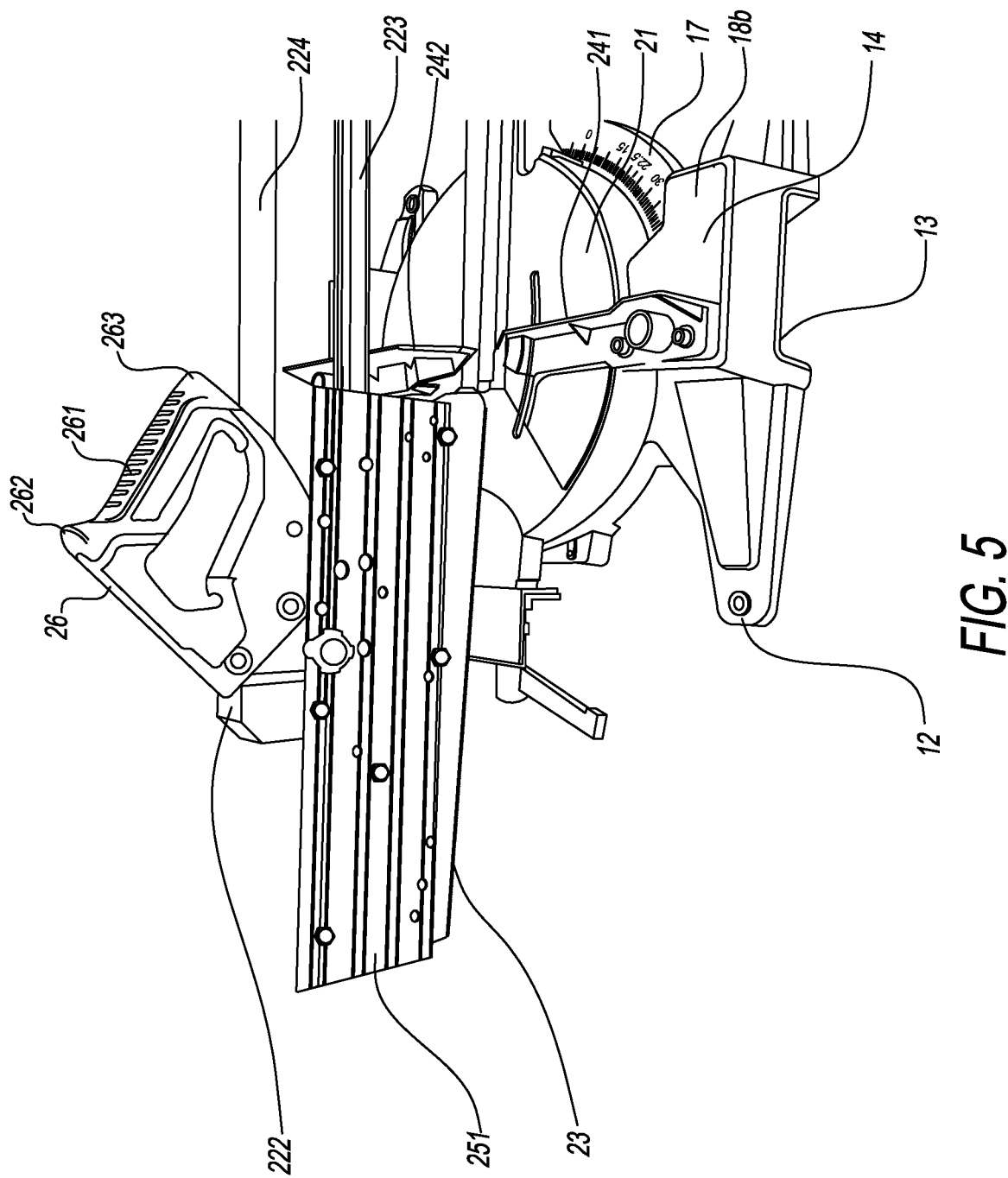
FIG. 5 is a side view of the saw system, according to an embodiment, in the engaged position.
Figure 6:
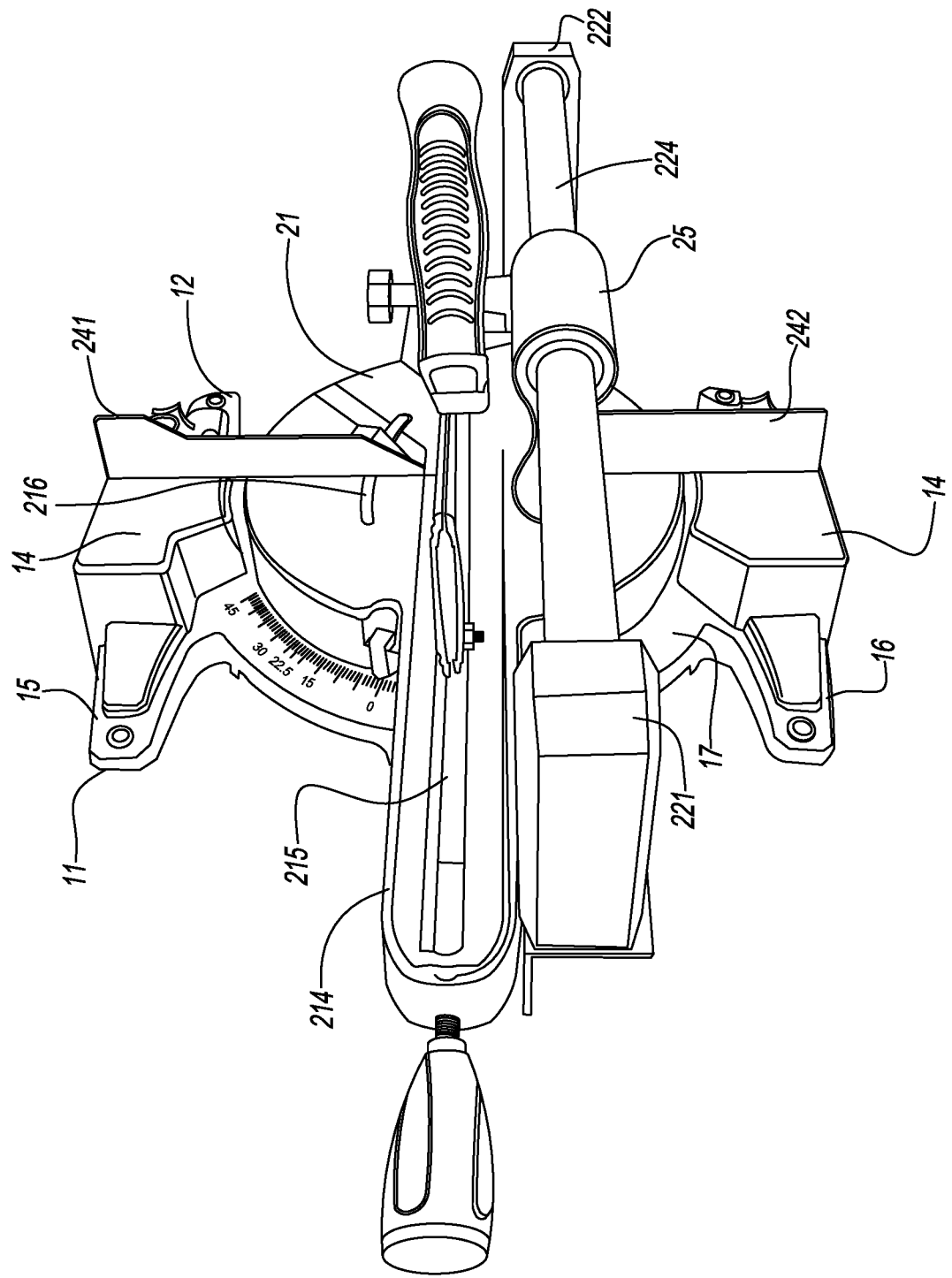
FIG. 6 is a front view of the saw system, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below by referring to the figures to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross-section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Substantially" and "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" or "about" can mean within one or more standard deviations, or within ±30%, 20%, 10%, 5% of the stated value.

In an embodiment, a saw system capable of cutting through a workpiece in one stroke is provided. FIGS. 1 to 6 show a one-stroke cut-through saw system, according to an embodiment. The saw system includes a base unit 1 and a cutting unit 2 which includes a turntable 21, a support structure 22, and an elongated (non-circular) blade 23 having a cutting edge 231 for cutting through a workpiece (not shown) in one push stroke.

The base unit 1 may be any unit known in the art that can provide a firm and stable foundation to the cutting unit 2. The base unit 1 may include a front edge 11, a rear edge 12 disposed opposite to the front edge 11, a bottom surface 13 extending from the front edge 11 to the rear edge 12, a top surface 14 disposed opposite to the bottom surface 13, a first side edge 15 connected between the front edge 11 and the rear edge 12, and a second side edge 16 disposed opposite to the first side edge 15.

Structurally, the base unit 1 may include a disk-like bottom frame 17, a first foot stand holder 18a, and a second foot stand holder 18b, respectively and horizontally connected to two opposite lateral sides of the disk-like bottom frame 17. The front edge 11 and the rear edge 12 may each respectively be formed by the disk-like bottom frame 17, the first foot stand holders 18a and the second foot stand holder 18b. The disk-like bottom frame 17 may include an angle scale to select a desired angle for cutting. The first side edge 15 and the second side edge 16 may respectively be formed on the first foot stand holder 18a and the second foot stand holder 18b at an outer side. The bottom surface 13 may be formed on the first and second foot stand holders 18a and 18b at a bottom side, and the top surface 14 may be formed on the first and second foot stand holders 18a and 18b at a top side. The base unit 1 may further include rubber legs to avoid scratching the floor. The number of rubber legs may vary as desired, for example, from 3 to 5.

The cutting unit 2 may be mounted on the base unit 1. The cutting unit 2 may include a turntable 21, a support structure 22, and an elongated blade 23 having a cutting edge 231 for cutting through a workpiece in one push stroke. Each of these elements will be described in detail below.

A turntable 21 may be rotatably mounted on a top wall of the disk-like bottom frame 17 of the base unit 1. The turntable 21 may include an outer boundary defining a working surface 212 opposite to the bottom surface 13 of the base unit 1. The turntable 21 may further include two platforms 213a and 213b extending outwardly from the opposite locations of the outer boundary. The platforms 213a and 213b may constitute a permanent part of the turntable 21 or may be fixedly attached thereto. The turntable 21 may further include a slot 214 including a cutting axis 215, which is parallel to the working surface 212 of the turntable 21. The slot 214 may be fixedly attached to the turntable 21 and is configured to receive a cutting edge 231 of an elongated blade 23. The slot 214 may extend from the center of the turntable 21 toward and over the front edge 11 of the base unit 1 in a direction parallel to the cutting axis 215. The slot may include a rotatable handle which one can comfortably use to rotate the saw and to lock the saw at various angles. The turntable 21 may further include a red pointer that points to a selected angle of the angle scale of the disk-like bottom frame 17.

The saw system may further include a fence assembly 24 that is configured to hold the workpiece on the working surface 212 of the turntable 21 in a certain position in order to achieve a cross-cut across the width of the workpiece. The fence assembly 24 may include a first fence member 241 fixedly attached to the top surface 14 of the first foot stand holder 18a and a second fence member 242 fixedly attached to the top surface 14 of the second foot stand holder 18b. Each of the first fence member 241 and the second fence member 242 may include a contact face 243 against which an edge of the workpiece is positioned. In an embodiment, the turntable 21 may include two curved slots 216 and 217 located concentrically to the outer boundary of the turntable 21, and a portion of the first and second fence members 241 and 242 may be protruded through the curved slots 216 and 217 to become engaged with the turntable 21. This specific arrangement allows to maintain the workpiece on the turntable 21 at the same position relative to the first and second fence members 241 and 242, while rotating the turntable 21 to select a desired cutting angle. The cutting axis 215 of the slot 214 may be perpendicular to the first and second fence members 241 and 242.

The saw system may further include a support structure 22 that is fixedly attached to the platforms 213a and 213b of the turntable. The support structure may include a first holding pillar 221 disposed on the first platform 213a and fixedly attached thereto, and a second holding pillar 222 disposed on the second platform 213b and fixedly attached thereto. The support structure 22 may further includes a pair of parallel sliding members including a first sliding member 223 and a second sliding member 224. Each of the first sliding member 223 and the second sliding member 224 may extend from the first holding pillar 221 to the second holding pillar 222 in a direction parallel to the working surface 212 of the turntable 21, and in a direction parallel to the cutting axis 215 of the slot 214. Each of the first sliding member 223 and the second sliding member 224 may include a proximal end 225 near the first holding pillar 221 and a distal end 226 near the second holding pillar 222. The first and second sliding members 223 and 224 may have any shape, and their arrangement and distance relative to each other may vary as desired. In an embodiment, the first and second sliding members 223 and 224 may be cylindrical rods disposed horizontally in the plane perpendicular to the working surface 212 of the turntable 21 (i.e., the first and second sliding members 223 and 224 may be disposed one over the other). In another embodiment, the cylindrical rods may be disposed horizontally in the plane parallel to the working surface 212 of the turntable 21. The sliding members may be connected to the first and second holding pillars 221 and 222 through mounting holes or mounting brackets.

The saw unit may further include a bearing member 25, which is mechanically engaged with (coupled to) the first and second sliding members 223 and 224, and which is capable of translationally moving (sliding) along the first and second sliding members 223 and 224. In an embodiment shown in FIG. 3, the first and second sliding members 223 and 224 may protrude through the bearing member 25. The bearing member 25 may be coupled to the sliding members in a manner which permits movement of the bearing member 25 between a disengaged position, wherein the bearing member 25 is near or in contact with the first holding pillar 221, and an engaged position, wherein the bearing member 25 is near or in contact with the second holding pillar 222. The bearing member 25 may further include a panel 251 fixedly attached thereto, which carries the elongated blade 23. Thus, the panel 251 may serve as a support carrier for the elongated blade 23. The panel 251 is optional as it may or may not be present. When the panel 251 is not present, the bearing member 25 may be directly attached to the elongated blade 23. Each of the first sliding member 223 and the second sliding member 224 may further include two rubber gaskets to prevent the bearing member 25 from directly contacting and damaging the first and second holding pillars 221 and 222.

The saw system may further include a handle assembly 26, which may be disposed on the bearing member 25 or which may be formed as a part of the bearing member 25. The handle assembly 26 typically includes a gripping portion 261, which is sloped to have its highest portion 262 furthest from the location of the person when using the apparatus, and a lowest portion 263 closest to the user. The handle assembly 26 allows the user to make a desired cut by pushing the bearing member 25 holding the panel 251 with the elongated blade 23 from the disengaged position to the engaged position. The handle assembly 26 may further include a locking pin (not shown) which is used to lock the saw at a certain position. This is especially useful during transportation, when the handle assembly may be conveniently locked in the middle between the disengaged and engaged positions. A user then can pick up the saw by the handle and carry it to the new place of work or to the car, as desired.

As described above, the elongated blade 23 may be fixedly attached to the bearing member 25 through the panel 251. Thus, the elongated blade 23, the panel 251, the handle assembly 26, the bearing member 25, the support structure 22, and the turntable 21 may be engaged with each other to form one cutting unit 2. The elongated blade 23 has a cutting edge 231 that cuts through a workpiece located on the turntable 21. The cutting edge 231 includes a proximal end 232 and a distal end 233. The cutting edge may include a portion having a straight contour, a curved contour, and a combination thereof. The elongated blade 23 may be permanently spaced from the turntable 21 to allow the lower portion of the elongated blade 23 including the proximal end 232 to enter into the slot 214. The cutting edge 231 of the elongated blade 23 is sloped and gradually becomes elevated toward the fence assembly 24. The elongated blade 23, the panel 251, the bearing member 25, the handle assembly 26, the support structure 22, and the turntable 21 may be all engaged with each other in one system to form one cutting unit 2 which may rotate around the vertical axis passing through the center of the turntable 21, to perform a desired cutting operation on the workpiece.

In an embodiment, the elongated blade 23 may be any reciprocating saw blade commonly used for cutting wood or plastic. The shape and size of the elongated blade 23 may vary depending on the nature of the cutting operation, and the material and size of the workpiece. In an embodiment, the blade may be a SharpTooth™ hand saw blade having a size ranging from about 8" to about 20", for example, from about 10" to about 18", or for example, from about 12" to about 16", but is not limited thereto. In an embodiment, a SharpTooth™ 15" hand saw blade may be effectively used as an elongated blade. Depending on the nature of the cutting operation, a person of ordinary skill in the art would be able to select an appropriate elongated blade 26 to cut through the workpiece in one push stroke using the present inventive saw assembly.

The workpiece may be positioned on the turntable 21 against the contact face 243 of the fence assembly 24 to accomplish a desired cut. The elongated blade 23 must be positioned at an acute angle relative to the working surface 212 of the turntable 21. Such a position is of critical importance, as it allows an effective cross-cut through the workpiece by using only one push stroke. The elongated blade 23 must be positioned such that a lower (submerged) portion thereof including the proximal end 232 of the cutting edge 231 is located inside the slot 214, and a higher (elevated) portion of the elongated blade 23 including the distal end 233 of the cutting edge 231 is positioned outside the slot 214. To make the cut, the distal end 233 of the cutting edge 231 must be located above the highest point of the workpiece.

For example, the blade may be positioned such that the cutting angle is from about 1° to about 35°, for example, from about 1° to about 25°, from about 1° to about 20°, from about 1° to about 15°, or from about 1° to about 10°. The cutting angle as used herein refers to the angle between the imaginary line connecting the distal end 233 of the cutting edge 231 to the proximal end 232 thereof and its projection onto the turntable, which is coincidental with the cutting axis. In an embodiment, the cutting angle may be about 2°, about 3°, about 4°, about 5°, about 6°, about 7°, about 8°, about 9°, but is not limited thereto. For example, the cutting angle may be from about 5° to about 8°, from about 6° to about 8°, or from about 7° to about 8°. In general, the smaller the cutting angle, the less physical pressure needs to be applied to make a clean cut. For example, the blade installed at 8° requires one to apply more physical pressure than the same blade installed at 5°. On the other hand, the smaller the cutting angle, the longer blade is needed to make a clean cut. For example, the 16" saw blade may be positioned at about 6°, the 15" saw blade may be positioned at about 7°, and a 14" saw blade may be positioned at about 8°. Given the reciprocal relationship between the cutting angle and the length of the saw blade, a person of ordinary skill in the art would be able to determine an optimal cutting angle for a saw blade having a specific length to make a clean cut using the present inventive saw assembly.

As noted above, the cutting edge 231 of the elongated blade 23 must be positioned at the acute angle to the working surface 212 of the turntable 21. It is apparent that, when the cutting edge 231 of the elongated blade 23 is parallel to the working surface 212 of the turntable 21, a clean cut cannot be made in one push stroke. Instead, a series of reciprocating saw blade movements are needed to cut through the workpiece. On the other hand, when the cutting angle between the imaginary line connecting the distal end 233 of the cutting edge 231 to the proximal end 232 thereof and its projection onto the turntable exceeds 35°, the position of the blade is too steep to cleanly cut the workpiece in one push stroke. The present inventors have unexpectedly found that, when the blade is positioned at the acute angle within the ranges described above, an effective and clean cross-cut of the workpiece may be achieved in one push stroke using the present inventive saw assembly, which requires minimum movement, and which generates a minimum amount of sawdust.

Figure 7:
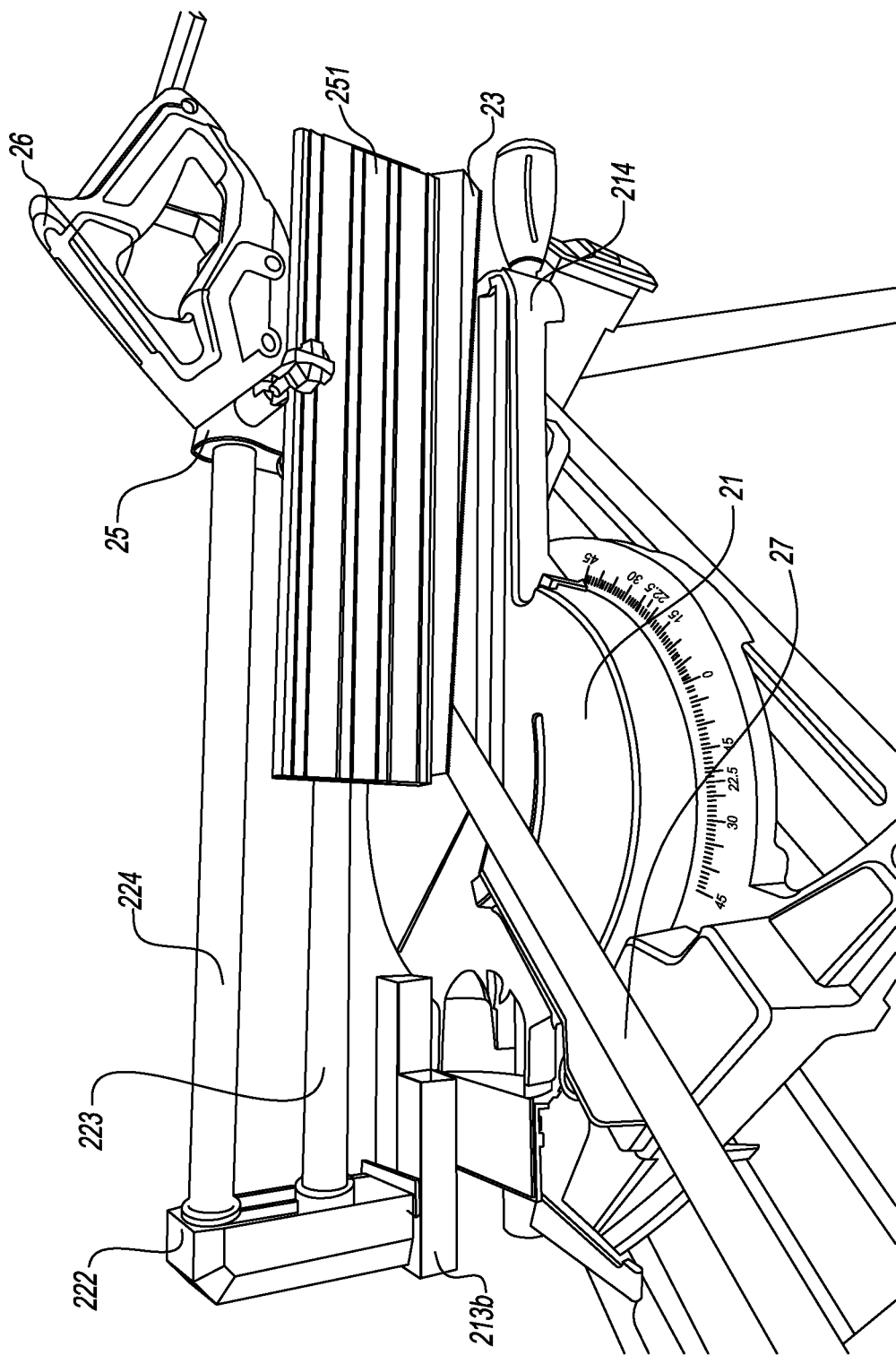
FIG. 7 is a side view of the saw system, according to an embodiment, with a workpiece to be cut.
Figure 8:
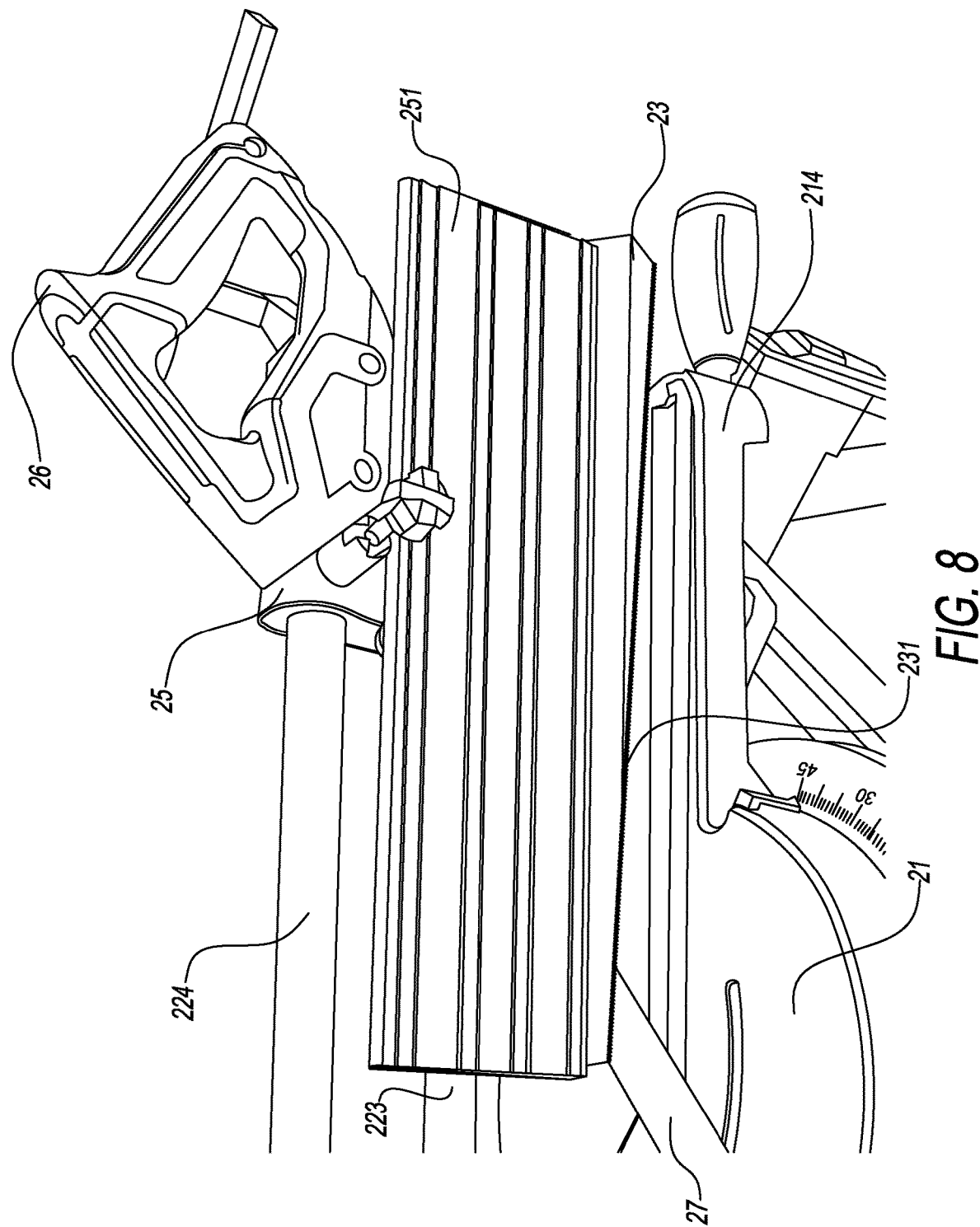
FIG. 8 is a view of the carrying assembly of the saw system, according to an embodiment, with the elongated blade attached to it.
Figure 9:
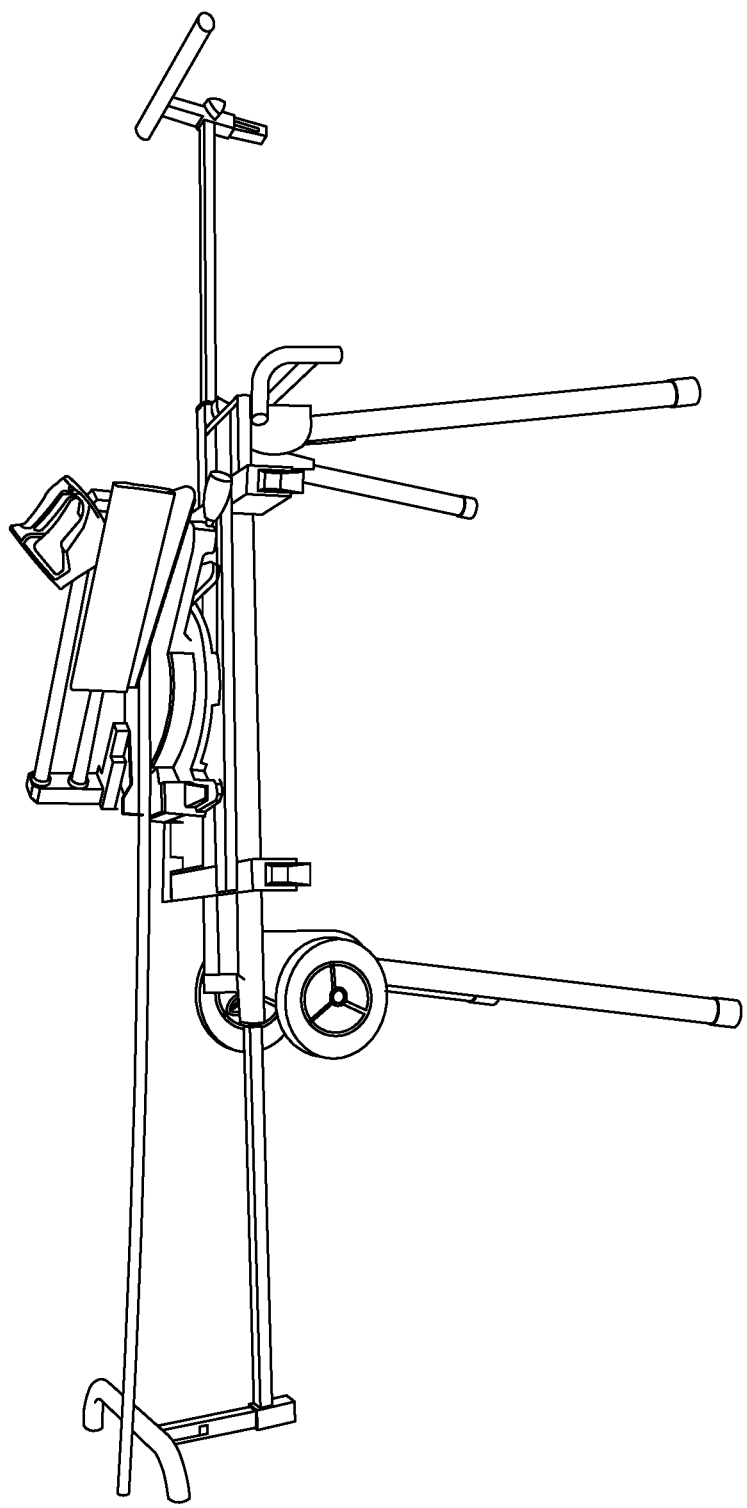
FIG. 9 is a view of the saw system disposed on a supporting table.

To operate the saw system, the sliding portion of the cutting unit 2 which includes the elongated blade 23, the panel 251, the bearing member 25, the handle assembly 26, may be placed in the disengaged position (see above). A workpiece 27 is then placed against the contact face 243 of the fence assembly 24 (as shown in FIGS. 7 to 9), and a sliding portion of the cutting unit 2 is pushed along the sliding members 223 and 224 to the engaged position. The workpiece 27 may be a piece of wood or plastic, and may be a dowel, a pipe, a floor trim, a door trim, a window trim, a ceiling trim, a wall trim, a multi-purpose trim, but is not limited thereto. During the push, the elongated blade 23 travels along the cutting axis of the slot 214 to cut through the workpiece 27 located on the worktable. The sliding portion of the cutting unit 2 is subsequently returned to the disengaged position to commence a new cutting operation on a new workpiece.

The saw system, according to an embodiment, has several advantages. Because of fast and repetitive movements, the fast-spinning circular saws and reciprocal saws generate a large amount of dust. In contrast, the saw system, according to an embodiment, allows to carry out a cut-through operation in only one stroke, generating a minimum amount of dust. The present saw system is especially beneficial for interior work areas and furnished settings, where generation of significant amount of dust is not desirable.

The saw system, according to an embodiment, may be easily operated by hand. It does not include fast moving parts and is safe in use. The saw system does not require a power supply, does not consume natural resources, and is therefore environmentally friendly.

The saw system, according to an embodiment, does not create continuous noise typically associated with reciprocal and circular saws. The disclosed saw system is portable, may easily fit in a household vehicle, and may therefore be easily relocated from one place to another.

The saw system, according to an embodiment, includes parts engaged with one another in one cutting unit. By rotating the turntable together with the fixedly attached elongated blade, the cutting unit may be conveniently positioned with regard to the fence assembly to make a desired cut.

While this disclosure has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:
1. A saw system comprising:
   a base,
   a turntable mounted on the base for rotation about a vertical axis, wherein the turntable has a planar support surface for supporting a workpiece, a support assembly fixedly attached to the turntable and defining a cutting axis, wherein the support assembly comprises:

two parallel sliding members comprising proximal ends and distal ends, a handle assembly coupled with a bearing member, which is mechanically engaged with the sliding members in a manner which permits translational movement of the bearing member along the sliding members between a first position, wherein the bearing member is located at the proximal ends of the sliding members, and a second position, wherein the bearing member is located at the distal ends thereof, and an elongated blade fixedly attached to the bearing member, wherein the elongated blade comprises a serrated cutting edge that is acutely angled relative to the support surface, wherein the elongated blade is movable along the sliding members such that, at the first position, the elongated blade partially passes the proximal ends of the sliding members, and, at the second position, the elongated blade partially passes the distal ends thereof, wherein the elongated blade is configured to cut through the workpiece in one push stroke.

2. The saw system of claim 1, wherein an angle between the serrated cutting edge and the support surface is from 3° to 10°.

3. The saw system of claim 1, wherein an angle between the serrated cutting edge and the support surface is from 5° to 8°.

4. The saw system of claim 1, wherein the sliding members are rods, wherein one of the rods is disposed over the other.

5. The saw system of claim 1, wherein the turntable further comprises a slot coextensive with the cutting axis.

6. The saw system of claim 5, wherein a lower portion of the elongated blade is positioned inside the slot.

7. The saw system of claim 5, wherein a higher portion of the elongated blade is positioned outside the slot.

8. The saw system of claim 1, wherein the elongated blade is engaged with the support assembly through a carrying assembly.

9. The saw system of claim 8, wherein the carrying assembly is a panel fixedly attached to the elongated blade.

10. The saw system of claim 1, wherein the workpiece comprises wood or plastic.

11. The saw system of claim 1, wherein the workpiece is a dowel, a pipe, a floor trim, a doortrim, a window trim, a ceiling trim, a wall trim, or a multi-purpose trim.

* * * * *